(12) United States Patent
Kato

(10) Patent No.: US 6,279,027 B1
(45) Date of Patent: *Aug. 21, 2001

(54) SCHEDULER REDUCING CACHE FAILURES AFTER CHECK POINTS IN A COMPUTER SYSTEM HAVING CHECK-POINT RESTART FUNCTIONS

(75) Inventor: Nobuhiro Kato, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/358,770

(22) Filed: Jul. 22, 1999

Related U.S. Application Data

(63) Continuation of application No. 08/868,619, filed on Jun. 3, 1997, now Pat. No. 5,968,168.

(30) Foreign Application Priority Data

Jun. 7, 1996 (JP) .................................................. 8-146039

(51) Int. Cl.[7] .................................................. G06F 11/14
(52) U.S. Cl. ........................... 709/102; 712/228; 714/15; 714/20
(58) Field of Search ................................ 709/102, 103; 712/228; 714/10, 13, 15, 20, 35; 711/147, 151, 158

(56) References Cited

U.S. PATENT DOCUMENTS

| | | | |
|---|---|---|---|
| 5,185,861 | 2/1993 | Valencia | 711/120 |
| 5,261,053 | 11/1993 | Valencia | 711/133 |
| 5,418,916 | 5/1995 | Hall et al. | 395/569 |
| 5,561,795 | 10/1996 | Sarkar | 707/202 |
| 5,574,902 | 11/1996 | Josten et al. | 707/1 |
| 5,752,268 | 5/1998 | Shimizu et al. | 711/162 |
| 5,787,243 | 7/1998 | Stiffler | 395/182.11 |

*Primary Examiner*—Viet D. Vu
(74) *Attorney, Agent, or Firm*—Finnegan, Henderson, Farabow, Garrett & Dunner, L.L.P.

(57) ABSTRACT

An identifier of a process, which is designed in advance to be executed only before a check point, is recorded on a delay process recording table, while an identifier of a process (check point process) exclusively for picking up a check point is recorded on a delay process recording table. A process queuing unit queues the process recorded on the delay process recording table to a delay executable queue, and queues the other processes to an executable queue. A process selecting unit selects and schedules one of the processes stored in the executable queue. Referring to the check point process recording table, it is determined whether the selected process is a check point process. If it is, all the processes stored in the delay executable queue are scheduled immediately before the check point process. Thus, an influence of delay in processing necessary for securing the matching of the system can be minimized.

4 Claims, 7 Drawing Sheets

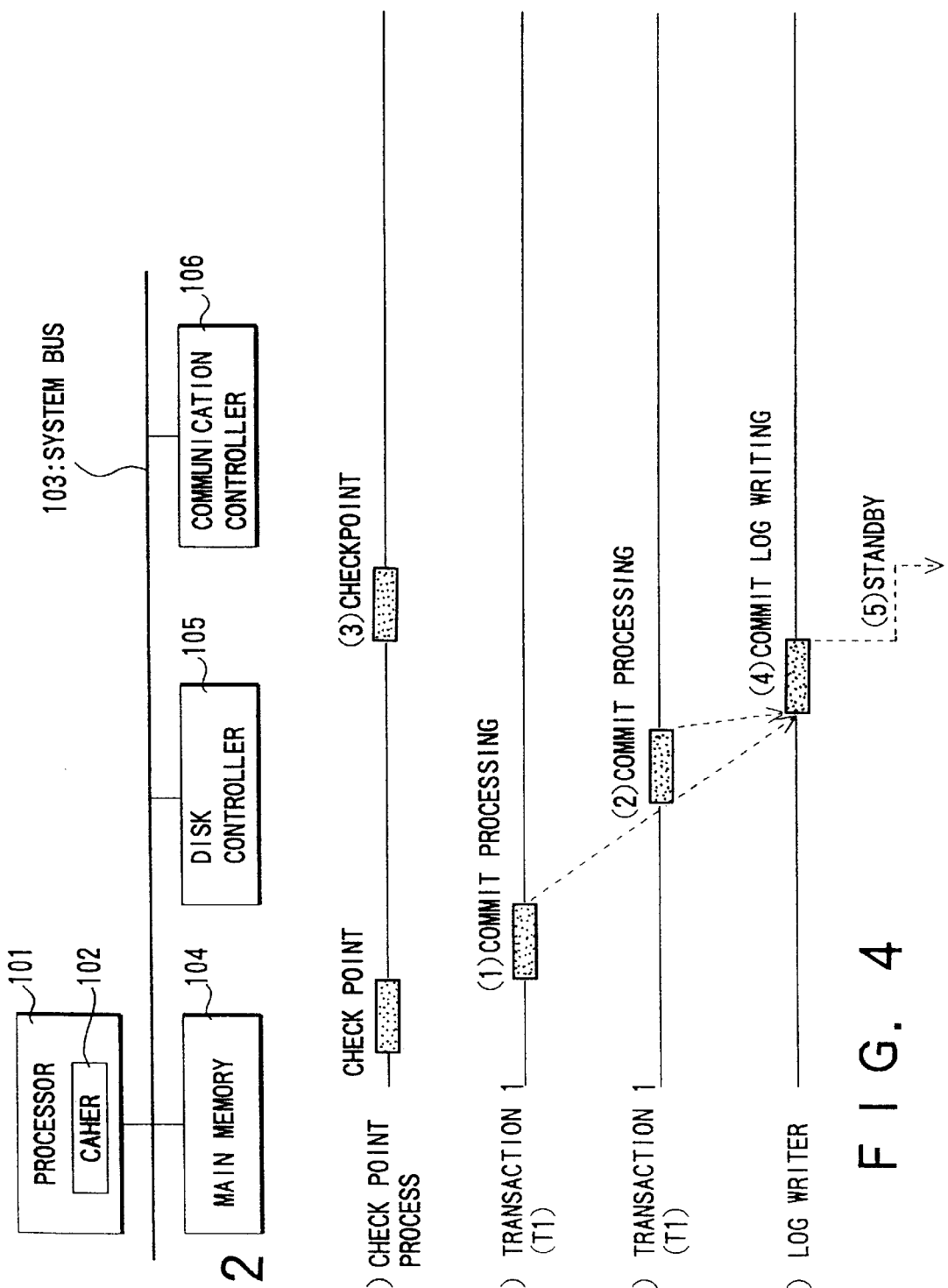
F I G. 2
F I G. 4

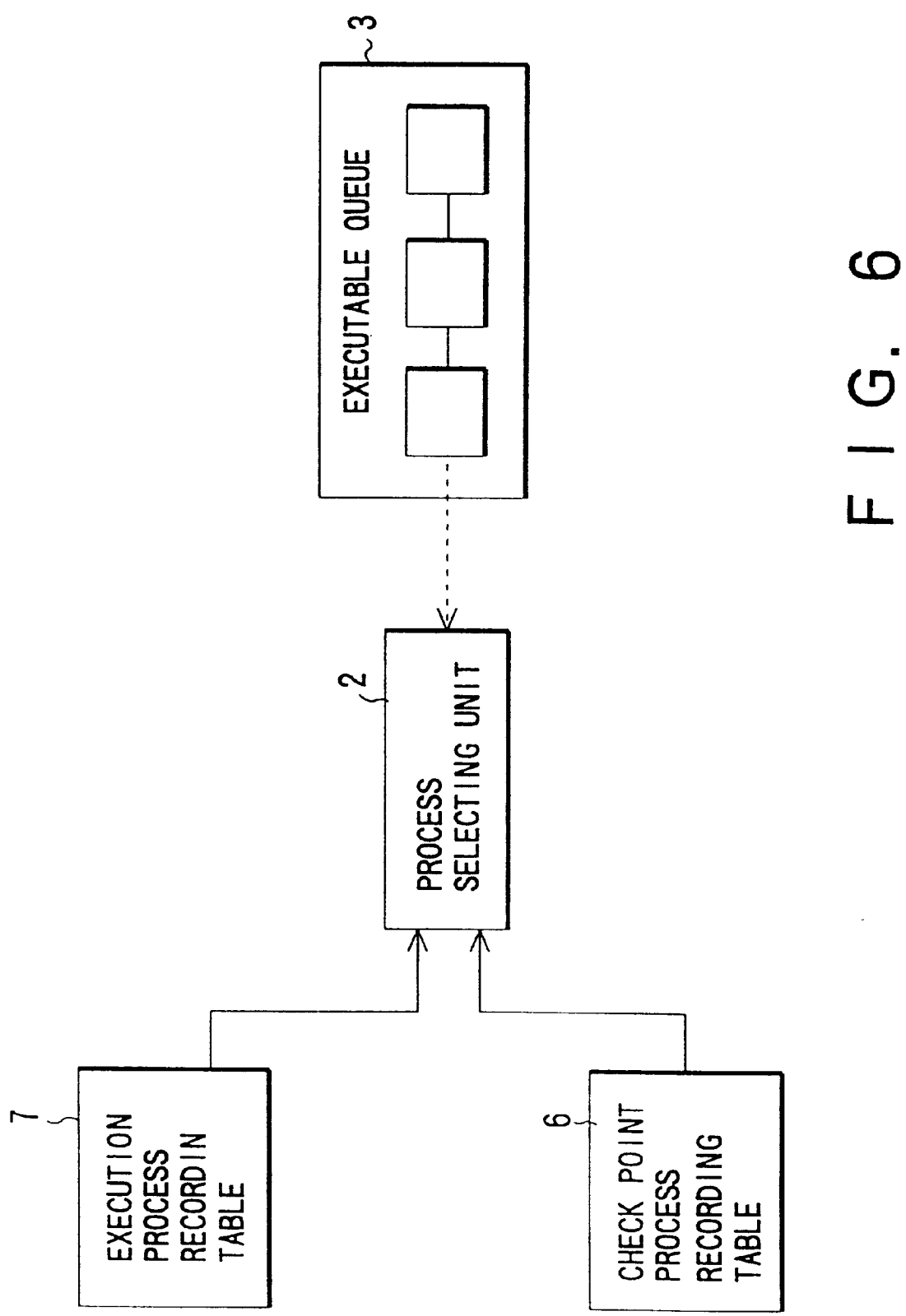
F I G. 6

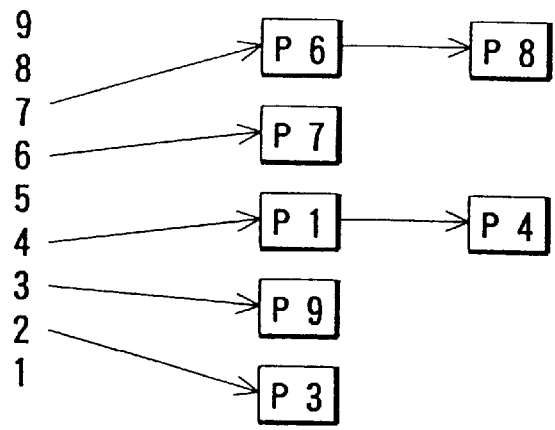
FIG. 8
FIG. 9
REWRITING POINT
TABLE 7
| P 2 | 2 |
| P 1 | 1 |
| P 5 | 5 |
| P 4 | 4 |
| P 3 | 3 |
ORDER FROM CHECK POINT
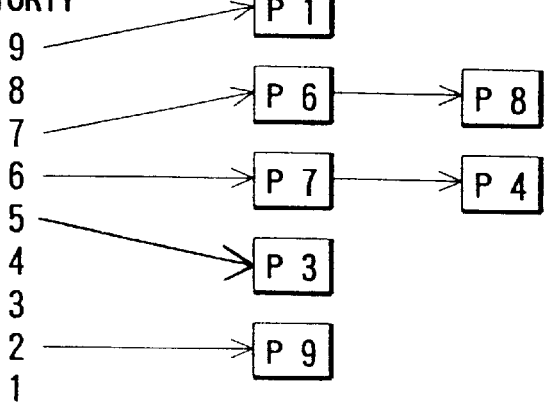
FIG. 10

SCHEDULER REDUCING CACHE FAILURES AFTER CHECK POINTS IN A COMPUTER SYSTEM HAVING CHECK-POINT RESTART FUNCTIONS

This is a continuation of application Ser. No. 08/868,619, filed Jun. 3, 1997, now U.S. Pat. No. 5,968,168, which is incorporated herein by reference.

BACKGROUND OF THE INVENTION

The present invention relates to a process switch apparatus suitably applied to, for example, a dispatcher of a computer system having a check point recovery function.

A conventional database management system is provided with a process (referred to as a log writer hereinafter) exclusively for writing a history of transaction processing (log) to a disk apparatus or the like. This log writer writes log data, which has been written to a log buffer area secured in a main memory, to the disk apparatus in a response to an instruction from another process or in predetermined timing. In order to maintain the consistency of a database, when the transaction is committed, its commit log has to be written to the disk apparatus. If, therefore, a process under execution of transaction starts a commit processing, it instructs the log writer to write its own commit log to the disk apparatus. In the log writer responds that the commit log has been written to the disk apparatus, the process under execution of transaction completes the commit processing.

Let us consider that the above database management system is operated in a computer system which causes a delay in writing to the disk apparatus until the next check point. These check points are picked up properly in order to allow a processing to be resumed while maintaining the matching of the whole system when the processing is interrupted due to a malfunction, and the states of the system (those of the CPU and main memory) necessary for continuing the processing is recorded for each of the check points.

As illustrated in FIG. 1, when the process under execution of transaction 1(T1) starts a commit processing (1), it instructs a log writer to write its own commit log to a disk apparatus. The log writer issues a command (write) for writing the commit log to the disk apparatus (2). In the computer system, however, the writing to the disk apparatus is delayed (4) until the next check point (3), and the log writer is placed in the writing standby (sleep) state until then.

In this state, when the process under execution of another transaction 2(T2) starts a commit processing (5), even though it instructs the log writer to write a commit log, the reception of the writing is delayed until its preceding writing is finished (6). The writing is also delayed (8) until the next check point (7).

In the computer system described above, the process exclusively used for picking up a check point (hereinafter referred to as a check point process) is executed by a processor to prevent the other processes from being operated during the pickup of the check point. Since the check point process is scheduled by the first priority, the process executed immediately before the check point is interrupted and the check point process starts to be executed. The check point process simply goes around an idle loop and hardly replaces data of a cache while hardware for a cache flash is returning data from a dirty line of the cache to a main memory. Thus, data to which the process executed immediately before the check point accesses, is held as it is in the cache at the end of the check point. However, the process executed immediately before the processing of the check point is completed, is not always prioritized. If another process is executed, neither cached commands nor data can be used, thus increasing in cache miss.

The first problem of the foregoing conventional system is that the process is switched to the log writer fairly prior to the check point. In other words, if the switching of the process is delayed until immediately before the check point, the commit log indicated later can be written to the disk apparatus, together with the commit log indicated earlier, at the next check point, thus improving in throughput.

The second problem is that the process executed immediately before the check point is not prioritized at the time of completion of the check point. In other words, taking into consideration that the check point process hardly replaces data of the cache, a cache miss can greatly be reduced by prioritizing the process executed immediately before the check point.

In a multiprocessor system as disclosed in U.S. Pat. Nos. 5,261,053 and 5,185,861, if the same process as the last process is executed within a predetermined period of time after the last process is executed, the last process is also assigned to the same processor. Since, in this case, no check point process is taken into consideration, the assignment of the process is not effectively controlled immediately after a check point if the time required for the check point process is long.

BRIEF SUMMARY OF THE INVENTION

It is accordingly an object of the present invention to provide a process switch apparatus capable of improving the throughput of a system by minimizing an influence of delay in processing necessary for securing the matching of the system and greatly reducing a cache miss after a check point is picked up.

To attain the above object, according to a first aspect of the present invention, there is provided a process switch apparatus in a computer system for properly picking up a check point for resuming an interrupted processing, and delaying a processing according to a request that data is to be output to an external device, which is made between two continuous check points, until a later-occurring one of the check points is picked up, the apparatus comprising:

storing means for storing processes including the processing according to the request and designed in advance to be executed only immediately before the check point;

detecting means for detecting a pickup point of a check point subsequent to the check point; and scheduling means for, when the detecting means detects the pickup point of the check point, scheduling an executable one of the processes stored in the storing means immediately before the pickup point of the check point.

In the process switch apparatus described above, as in the log writer, the selection of a process exclusively for writing data to a disk can be delayed until immediately before the pickup point of a check point, and a plurality of writing requests made in one interval between continuous check points, can be made as one request at the next check point. Thus, not only the response time of the commit processing can be shortened, but also the throughput can be improved by group commit.

According to a second aspect of the present invention, there is provided a process switch apparatus in a computer system for properly picking up a check point for resuming an interrupted processing, comprising:

storing means for storing a process executed immediately before the check point; and scheduling means for, when the process stored in the storing means is executable immediately after the check point is picked up, scheduling the process by priority.

In the process switch apparatus described above, when a process, which was executed immediately before a check point, is in an executable state, the process is scheduled by priority. Since, at the completion of the check point, a large amount of data to which the process executed immediately before the check point accesses, remains in a cache, the hit ratio is improved more than when another process is executed. The system can thus be improved in performance.

According to a third aspect of the present invention, there is provided a process switch apparatus in a computer system for properly picking up a check point for resuming an interrupted processing, comprising:

storing means for storing execution order of processes to be executed before the check point; and scheduling means for, when the processes stored in the storing means are executable immediately after the check point is picked up, scheduling one of the processes, which is nearest to the check point, by priority.

In the process switch apparatus described above, a process executed nearest to a check point is scheduled by priority immediately after the check point. Generally, there is strong possibility that data of a process executed nearer to a check point remains in a cache. Thus, the hit ratio of the cache is improved, and the performance of the system can be improved.

According to a fourth embodiment of the present invention, there is provided a switch apparatus in a computer system for properly picking up a check point for resuming an interrupted processing, the computer system including a processor having a count function of counting the number of executive instructions for each process, the apparatus comprising:

storing means for storing processes executed before the check point together with the number of executive instructions counted by the count function; and scheduling means for, when the processes stored in the storing means are executable immediately after the check point is picked up, scheduling one of the processes having a large number of executive instructions, by priority.

In the process switch apparatus, of the processes which were executed before a check point and which are executable at the present time, a process having a large number of executive instructions is selected and executed by priority. In general, the larger the number of instructions of a process executed continuously by a processor, the larger the number of instructions and the larger the amount of data about the process, held in a cache. If, therefore, such a process is executed by priority after the check point, the cache hit ratio can be increased.

In the process switch apparatus described above, the scheduling means has means for determining a relationship in priority between the processes stored in the storing means and other processes in accordance with the number of executive instructions of processes executed from completion of execution of the processes stored in the storing means to present time.

It is generally considered that if a larger number of processes are executed from completion of a process to starting of the next process, the cache miss ratio of a resumed process is increased. In other words, since the cache miss ratio of a resumed process can be estimated by counting the number of instructions executed by the other process before the resumption of the process by the count function, only the process of low cache miss ratio is scheduled, thus allowing the process to be switched appropriately.

In the process switch apparatus described above, the count function of the processor includes a function of counting the number of cache misses;

the storing means includes means for storing a cache miss ratio of processes continuously executed; and the scheduling means includes determination means for determining whether a cache miss ratio of a process improved in priority is lower than normal, and means for determining priority of a process based on a result of determination obtained by the determination means.

By measuring the cache miss ratio of a process improved in priority and comparing it with the normal cache miss ratio, the result of the improvement in priority can be known. If the result is fed back to determination of priority, the scheduling of a process can be prioritized more appropriately.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram of the constitution of a computer system according to a first embodiment of the present invention;

FIG. 4 is a view showing a procedure of the computer system of FIG. 2;

FIG. 6 is a block diagram showing some of functions of an operating system operated by a computer system according to a second embodiment of the present invention;

FIG. 8 is a diagram illustrating the priority of respective processes in an executable queue of the computer system of FIG. 6;

FIG. 9 is a diagram illustrating recording states of a running process recording table of the computer system of FIG. 6; and FIG. 10 is a diagram illustrating results of changes in priority of the processes of the executable queue of the computer system of FIG. 6.

DETAILED DESCRIPTION OF THE INVENTION

Figure 1:
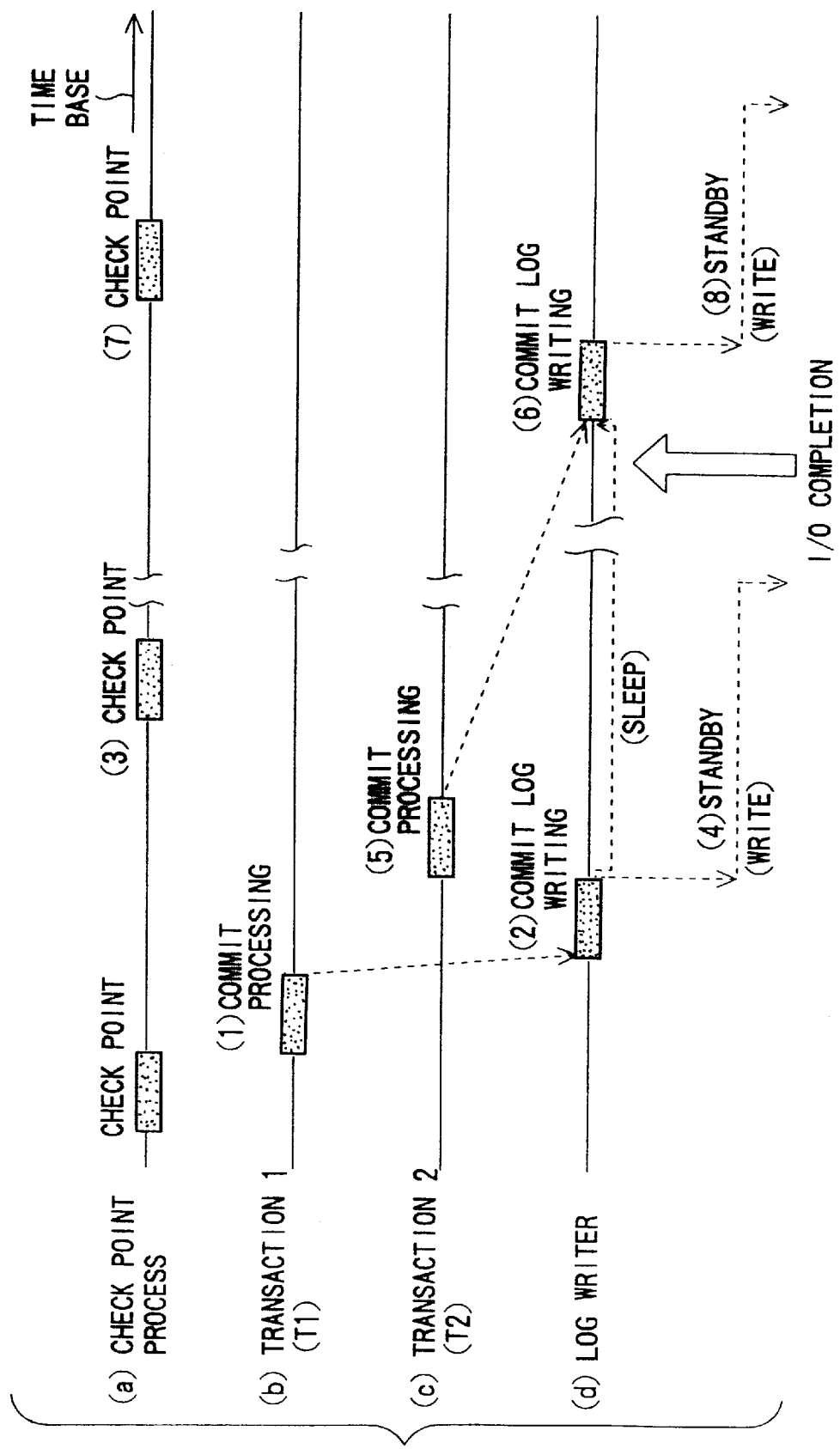
FIG. 1 is a view showing a procedure including a log writer of a conventional computer system.

Embodiments of the present invention will now be described with reference to the accompanying drawings.

(First Embodiment)

FIG. 2 shows the constitution of a computer system according to the first embodiment of the present invention. This computer system includes a processor 101, a main memory 104, a disk controller 105, and a communication controller 106. These are connected to a system bus 103.

The processor 101 has a cache 102 inside and executes an operating system and an application program stored in the main memory 104. The main memory 104 is a memory device for storing the operating system and application program, data to be processed, and the like. The disk controller 105 controls a disk device serving as an external memory. The communication controller 106 transmits/receives data to/from, e.g., a network. Various devices, such as a controller for controlling a data input/output device for reading data recorded on a recording medium, are connected to the system bus 103.

Figure 3:
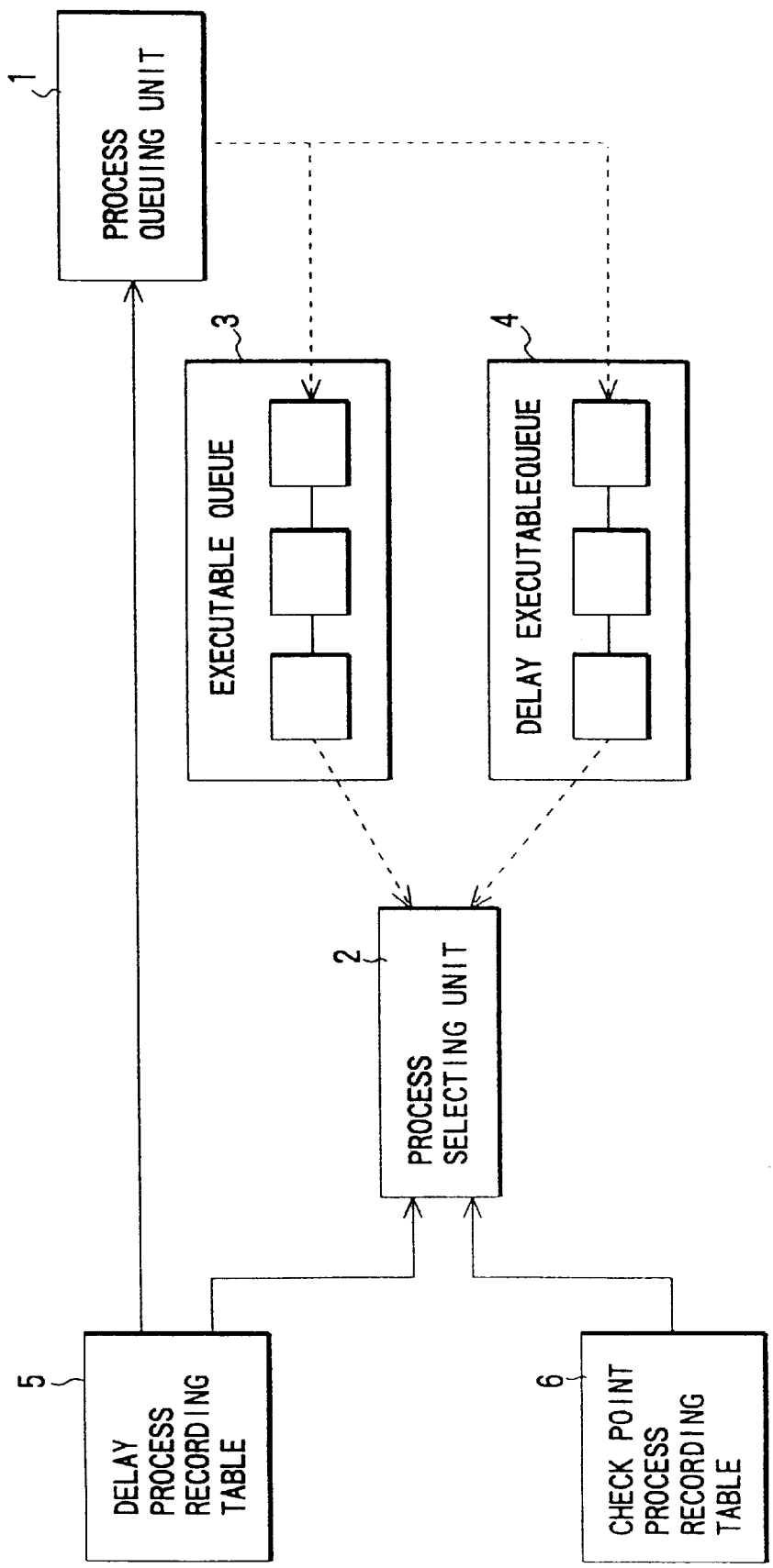
FIG. 3 is a block diagram showing some of functions of an operating system operated by the computer system of FIG. 2.

FIG. 3 illustrates some of function blocks of an operating system operated by the computer system of the first embodiment having the above constitution. In this computer system, when a check point is picked up, the processor is so operated as to inhibit the first-priority check point process from being interrupted. An identifier of the check point process is recorded in advance on a check point process recording table 6, while an identifier of a process indicated to be executed only immediately before the pickup point of the check point is recorded in advance on a delay process recording table 5.

A process queuing unit 1 checks whether an executable process is one recorded on the delay process recording table 5. If the process is not recorded, it is queued to an executable queue 3, while if it is recorded, it is queued to a delay executable queue 4. First, the process selecting unit 2 selects the first-priority process from the executable queue 3. Referring to the check point process recording table 6, the process selecting unit 2 checks the delay executable queue 4 when the selected process is a check point process. If the delay executable queue 4 has no process, the check point process is excluded from the executable queue 3 and scheduled as it is. On the other hand, if the delay executable queue 4 has a process, the process is excluded from the queue 4 and scheduled so as to have the first priority and inhibit an interruption.

When the execution of the above delay process is completed, the process selecting unit 2 selects the first-priority process (which inevitably corresponds to the check point process) from the executable queue 3 and schedules the process, and repeats the same operation as described above.

A procedure of the computer system of the first embodiment will be described referring to FIG. 4. At the time when transaction 1(T1) requests a commit processing (1), a log writer is placed into an executable state and connected to the delay executable queue 4 (in this case the log writer is recorded on the delay process recording table 5). When transaction 2(T2) requests a commit processing (2), the log writer has not yet been executed, and a commit log written by the transaction 2(T2) is recorded in a log buffer. A check point (3) is started when the process selecting unit 2 selects the executable check point process. Since then the delay executable queue 4 has the log writer, the log writer is scheduled (4) immediately before the check point. The check point process is detected referring to the check point process recording table 6 (in this case the check point process is recorded in advance in the table 6). The log writer issues a command instruction (write system call) for writing the commit logs of transactions 1(T1) and 2(T2) written to the log buffer, and stops to stand by for completion of writing (5). At this time, there is no process in the delay executable queue 4; therefore, the process selecting unit 2 schedules the check point process.

Figure 5:
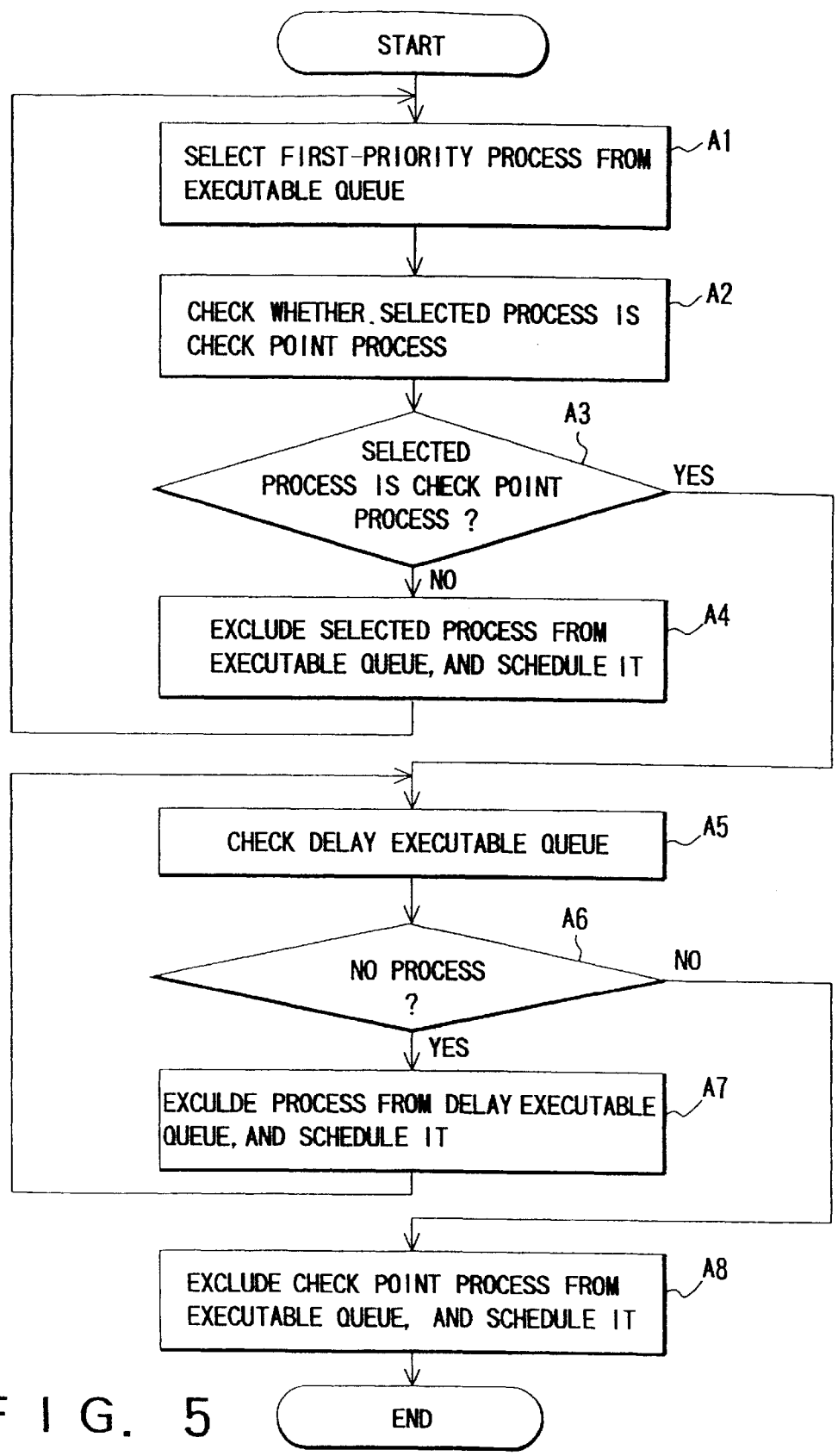
FIG. 5 is a flowchart showing an operation of a process switching unit of the computer system of FIG. 2.

An operation of the process selecting unit 2 will now be described with reference to FIG. 5.

The process selecting unit 2 selects the first priority process from the executable queue 3 (step A1) and refers to the check point process recording table 6 to determine whether the selected process is a check point process (step A2).

If the selected process is not the check point process (step A3, NO), it is excluded from the executable queue 3 and scheduled (step A4). If the selected process is a check point process (step A3, YES), it is checked whether there is no process to be executed immediately before the check point process, referring to the delay executable queue 4 (step A5).

If the delay executable queue 4 includes the process to be executed (step A6, YES), the process is excluded from the queue 4 and scheduled (step A7), and the processing is repeated from step A5. If the delay executable queue 4 has no process or loses all processes (step A6, NO), the check point process is excluded from the executable queue 3 and scheduled (step A8).

Consequently, the above steps minimize the influence of a delay in processing required for securing the matching of the system, with the result that the throughput of the entire system can be improved.

(Second Embodiment)

A computer system according to the second embodiment of the present invention will now be described with reference to FIGS. 6 to 10.

FIG. 6 is a block diagram showing some of functions of an operating system operated by the computer system. An identifier of a check point process is recorded in advance in a check point process recording table 6. Referring to the table 6, the process selecting unit 2 checks whether a process to be selected next is a check point process. If it is not the check point process, the unit 2 records a process to be selected next in an execution process recording table 7. On the other hand, if it is the check point, it is not recorded in the table 7. The process selecting unit 2 also refers to the table 7 to check whether the currently-executed process is a check point process. If it is the check point process, the process selecting unit 2 refers to the check point process recording table 6 to check whether the process recorded in the table 6 is present in an executable queue 3. If the process is in the queue 3, it is scheduled, whereas if it is not therein, the first-priority process is scheduled.

Figure 7:
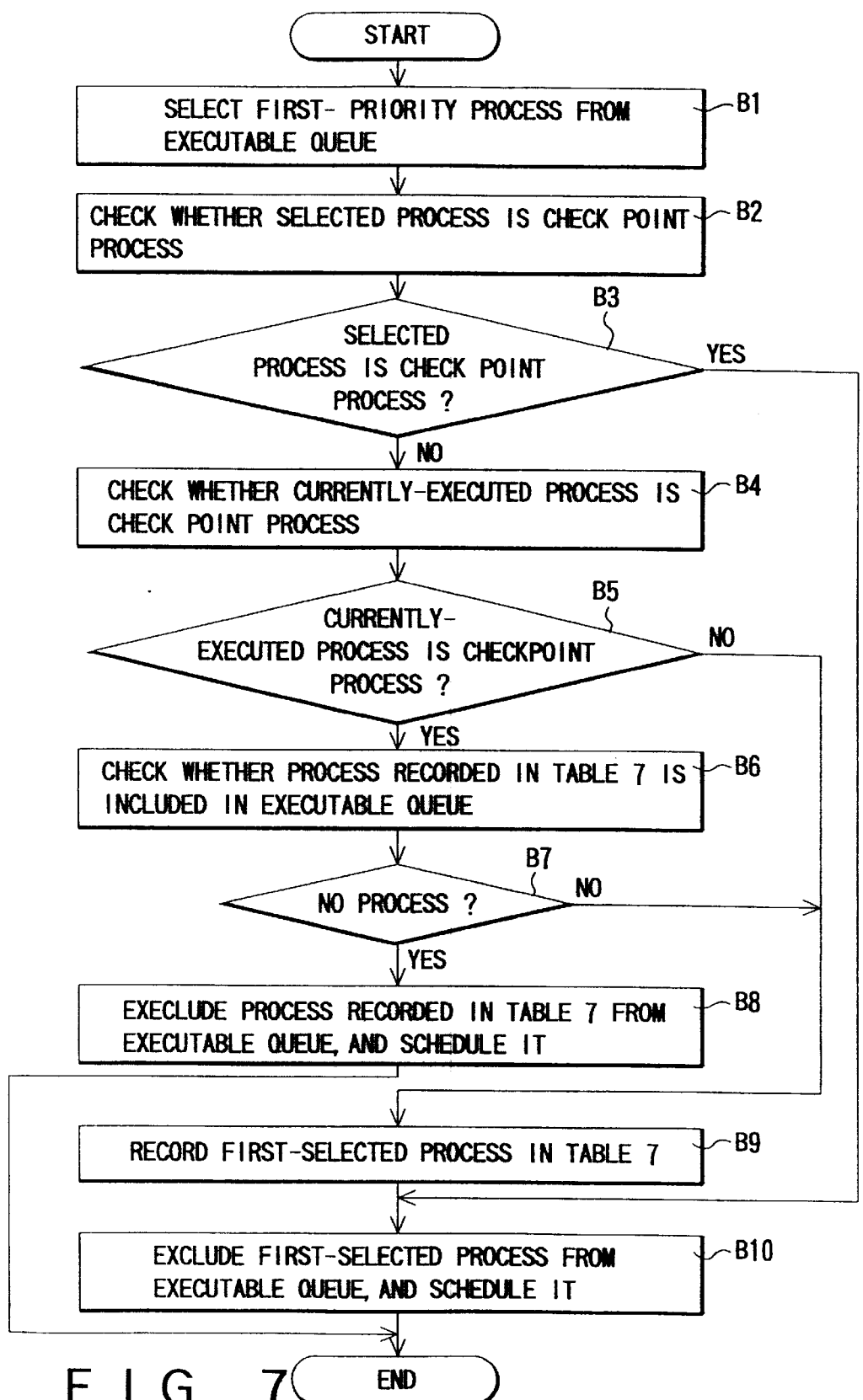
FIG. 7 is a flowchart showing an operation of a process switching unit of the computer system of FIG. 6.

FIG. 7 shows a procedure for operating the process selecting unit 2 of the second embodiment.

The process selecting unit 2 selects the first priority process from the executable queue 3 (step B1) and refers to the check point process recording table 6 to determine whether the selected process is a check point process (step B2).

If the selected process is a check point process (step B3, YES), it (check point process) is excluded from the executable queue 3 and scheduled (step B10). On the other hand, if the selected process is not a check point process, (step B3, NO), it is determined whether the currently-executed process is a check point process (step B4). If it is a check point process (step B5, YES), the unit 2 refers to the execution process recording table 7 to check whether the process recorded in the table 7 is present in the executable queue 3 (step B6). If the process is present therein (step B7, YES), it is excluded from the executable queue 3 and scheduled (step B8).

If the process recorded in the table 7 is not present in the executable queue 3 (step B7, NO), or if the currently-executed process is not a check point process (step B5, NO), the process selected from the executable queue 3 is recorded in the execution process recording table 7 (step B9), then excluded from the execution queue 3, and scheduled (step B10).

Subsequently to the check point process, its preceding process is executed if it is executable, thus greatly decreasing in cache miss ratio.

It is effective to provide a plurality of entries in the execution process recording table 7 in order to record some of the latest-executed processes. In this case, the process selecting unit 2 refers to the execution process recording table 7 at the time of completion of the check point process. If the process executed immediately before the check point is executable, it is scheduled. If not, executable ones of the processes recorded in the execution process recording table 7 are prioritized. The nearer to the check point a process is, the higher priority the process has. For example, FIG. 8 shows the priority of each process in the executable queue 3, while FIG. 9 does the recording state of the execution process recording table 7 at the time of completion of the check point process. The execution process recording table 7 is used cyclically, and the pointer always points out the next entry (rewriting point) of the latest recording position.

Assuming that, for example, processes P1, P3 and P4 are executable in the execution process recording table 7 and the priorities of these executable processes P1, P3 and P4 are increased by "5", "3" and "2", respectively in execution order, the priorities as shown in FIG. 10 are obtained. At the time of completion of the check point process, the process P1 is selected and scheduled.

If the processor 101 has a function of counting the number of executive instructions, it is effective to count the number of executive instructions of each process performed continuously, for the priority can be controlled taking into consideration that the larger the number of commands performed continuously by a process, the larger the number of commands and data of the process is held in the cache. For example, the priority between a process recorded in the execution process recording table 7 and a process not recorded therein can be determined as follows. The scheduling of the process recorded in the table 7 does not always take first priority. Considering the number of executive instructions of another process performed until the present time from the end of the execution of the process recorded in the table 7, the process not recorded therein can be scheduled earlier in accordance with the original priority. It is desirable not to increase the priority of the scheduling at the end of the check point, but to obtain and use the temporary priority in accordance with the number of executive instructions when a process is selected.

If, furthermore, the processor 101 has a function of counting the number of cache misses, it is possible to determine whether the cache miss ratio of a process performed by priority by the method which has been so far described is lower than usual. If the cache miss ratio is lower than usual, any operation need not be carried out. On the other hand, if it is not lower, it is desirable to obtain the upper limit of the number of executive instructions for each process from the correlation between the number of commands performed from immediately before the process and the cache miss ratio and not to increase the priority when the number of executive instructions is larger than the upper limit.

Consequently, the processes can be switched more appropriately on the basis of the operating state of the computer system.

The above-mentioned process switching method, which is one of the functions of the operating system operated in the computer system, can be stored, as a program controlled by a computer, in a recording medium, e.g., a magnetic disk such as a floppy disk and a hard disk, an optical disk such as a CD-ROM and a DVD, and a semiconductor memory, and distributed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A process switch apparatus in a computer system for properly picking up a check point for resuming an interrupted processing, comprising:

storing means for storing a process executed immediately before the check point; and scheduling means for, when the process stored in said storing means is executable immediately after the check point is picked up, scheduling the execution of the process and, when the process is not executable, scheduling the execution of another process.

2. A process switch apparatus in a computer system for properly picking up a check point for resuming an interrupted processing, comprising:

storing means for storing execution order of a plurality of process executed before the check point; and scheduling means for, when there are processes, among the processes stored in said storing means, that are executable immediately after the check point is picked up, scheduling a process which is executable and nearest to the check point in the order, of the plurality of processes.

3. A method of switching a process in a computer system for properly picking up a check point for resuming an interrupted processing, said method comprising the step of:

storing a process executed immediately before the check point; and scheduling the execution of the process when the process is executable immediately after the check point is set, and, when the process is not executable, scheduling the execution of another process.

4. A method of switching a process in a computer system for properly picking up a check point for resuming an interrupted processing, said method comprising the steps of:

storing execution order of a plurality of processes executed before the check point; and scheduling a process which is executable and nearest to the check point in the order, of the plurality of processes when there are processes, among the processes stored in said storing means, that are executable immediately after the check point is picked up.

* * * * *